United States Patent [19]

Dang et al.

[11] Patent Number: 4,574,351
[45] Date of Patent: Mar. 4, 1986

[54] APPARATUS FOR COMPRESSING AND BUFFERING DATA

[75] Inventors: Lam Q. Dang; Charles P. Geer; Merle E. Houdek; Eugene R. Jones; Frank G. Soltis; John A. Soyring; Thomas M. Walker, all of Rochester, Minn.

[73] Assignee: International Business Machines Corporation, Armonk, N.Y.

[21] Appl. No.: 471,944

[22] Filed: Mar. 3, 1983

[51] Int. Cl.$^4$ .................. G06F 15/74; G06F 5/00
[52] U.S. Cl. .................................. 364/200; 364/900
[58] Field of Search ... 364/200 MS File, 900 MS File, 364/300; 358/260

[56] References Cited

U.S. PATENT DOCUMENTS

| | | | |
|---|---|---|---|
| 4,031,515 | 6/1977 | Kachio | 364/900 |
| 4,044,337 | 8/1977 | Hicks et al. | 364/200 |
| 4,054,951 | 10/1977 | Jackson et al. | 364/900 |
| 4,068,304 | 1/1978 | Beausoleil et al. | 364/200 |
| 4,205,370 | 5/1980 | Hirtle | 364/200 |
| 4,218,743 | 8/1980 | Hoffman et al. | 364/200 |
| 4,232,375 | 11/1980 | Paugstat et al. | 364/900 |
| 4,241,396 | 12/1980 | Mitchell et al. | 364/200 |
| 4,251,860 | 2/1981 | Mitchell et al. | 364/200 |
| 4,251,864 | 2/1981 | Kindell et al. | 364/200 |
| 4,321,668 | 3/1982 | Flynn et al. | 364/200 |
| 4,376,933 | 3/1983 | Saran et al. | 364/900 |
| 4,412,306 | 10/1983 | Moll | 364/900 |
| 4,482,952 | 11/1984 | Akagi | 364/200 |
| 4,503,495 | 3/1985 | Boudrean | 364/200 |

OTHER PUBLICATIONS

Monitoring Apparatus for Dynamic System Timing—IBM Technical Disclosure Bulletin, vol. 25, No. 5, Oct. 1982, pp. 2439-2441.
Virtual Address Trace Mechanism—IBM Technical Disclosure Bulletin, vol. 26, No. 2, Jul. 1983, pp. 831-833.

Primary Examiner—James D. Thomas
Assistant Examiner—Thomas Lee
Attorney, Agent, or Firm—Donald F. Voss; Bradley A. Forrest

[57] ABSTRACT

Apparatus for compressing and buffering large amounts of data, transferring the buffered data to a slower speed storage device and controlling the stopping and starting of the central processing unit (CPU) is provided for a virtual storage computer system where the data is collected in real time; the data being collected are all storage addresses to facilitate address tracing. Each real main storage address is collected to the external interface between the central processing unit (CPU) and main storage and converted to a virtual address. The virtual address is compressed and entered into a large buffer via buffer control logic. The buffer control logic sends a signal to stop the CPU when the buffer becomes full and restarts it at the exact point it had stopped after the buffer has been emptied by the transfer of data from it to a slower speed storage device.

12 Claims, 16 Drawing Figures

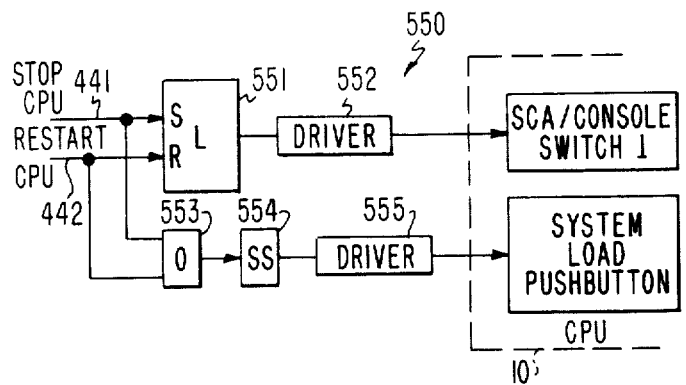
FIG. 10
FIG. 4
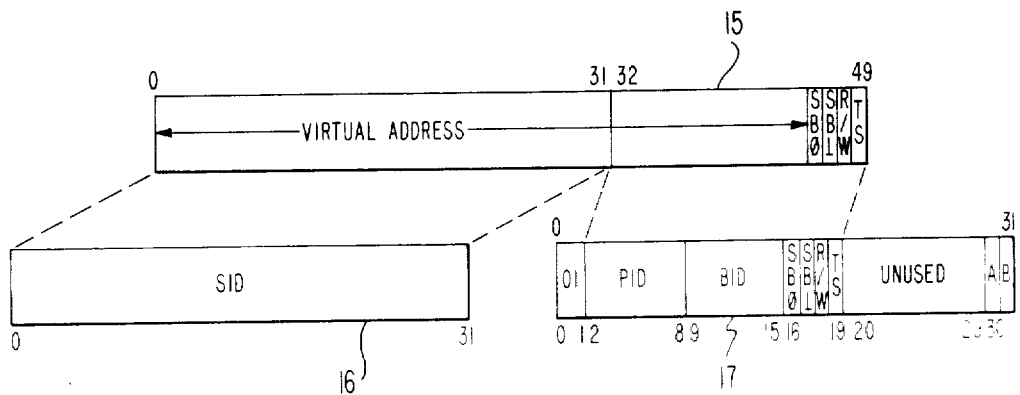

APPARATUS FOR COMPRESSING AND BUFFERING DATA

BACKGROUND OF THE INVENTION

1. Field of the Invention

This invention relates to apparatus for compressing and buffering large amounts of data in a computer system and more particularly to such apparatus which receives in real time main storage addresses collected by hardware data collection apparatus and transfers the buffered data to slower speed data storage to facilitate address tracing.

This invention finds particular utility in a computer system which operates at relatively high speed and utilizes large main storage addresses such as large virtual storage addresses.

2. Description of the Prior Art

During the design phase of a computer system and after the computer system has been placed into operation, it is often desirable to monitor its operation by collecting data such as main storage addresses. The data collected is useful for design modification and tuning of the computer system. The most desirable arrangement is to collect this data while the computer is operating in a normal manner and to do so with minimum interference with the operation of the computer system. In the past, when possible, a faster computer system with sufficient storage capacity would be used to monitor the slower computer system. That arrangement of course is expensive and not particularly feasible for field use.

Another approach has been to collect only samples of the data being sought. This approach is not suitable when an address trace is required. The present invention permits all main storage addresses to be collected. The apparatus for performing the data collection can be of the type shown and described in the IBM Technical Disclosure Bulletin for Virtual Address Trace Mechanism, page 831-833 dated July 1983 which is more suitable than the arrangement set forth in the IBM Technical Disclosure Bulletin for Virtual Address Monitoring Technique, page 4625, dated May 1977.

SUMMARY OF THE INVENTION

The principal objects of the invention are to collect in real time all main storage addresses in a virtual storage system. This creates a problem or requirement to accept and store large amounts of data. The objectives are achieved by compressing the storage addresses in real time with the operation of the computer system and loading the compressed addresses into a large buffer. When the buffer becomes full, control apparatus stops the central processing unit (CPU) of the computer system and then restarts the CPU after the buffer has been emptied by transferring the contents to a slower speed storage device without disturbing the condition of the computer system.

BRIEF DESCRIPTION OF THE DRAWINGS

FIG. 4 is a diagram illustrating the format of the data from the data collection logic and the formats of the output data from the address compression logic;

FIG. 10 is a schematic logic diagram of the CPU stop/restart control circuitry.

DESCRIPTION OF THE INVENTION

Figure 1:
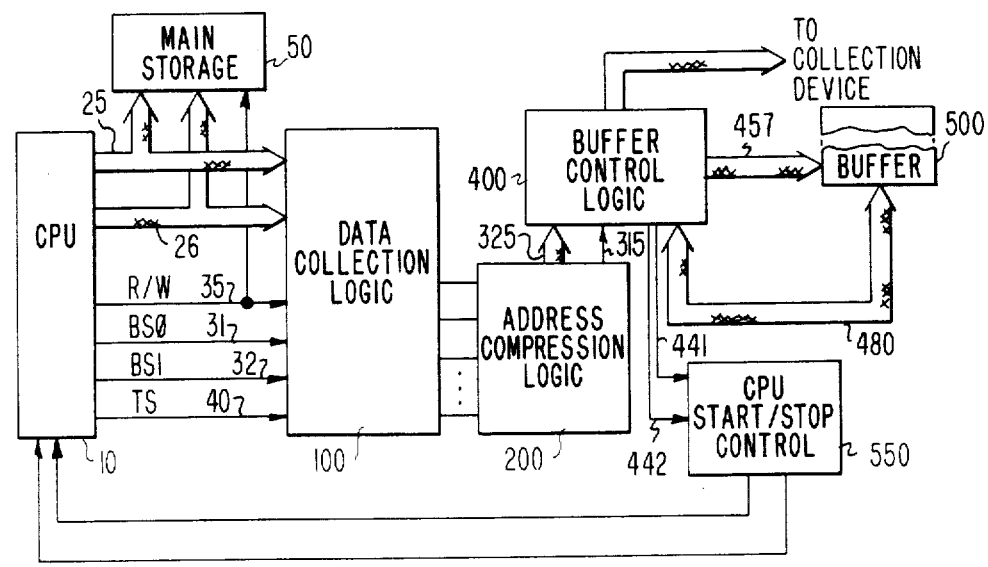
FIG. 1 is a block diagram of the invention.
Figure 2:
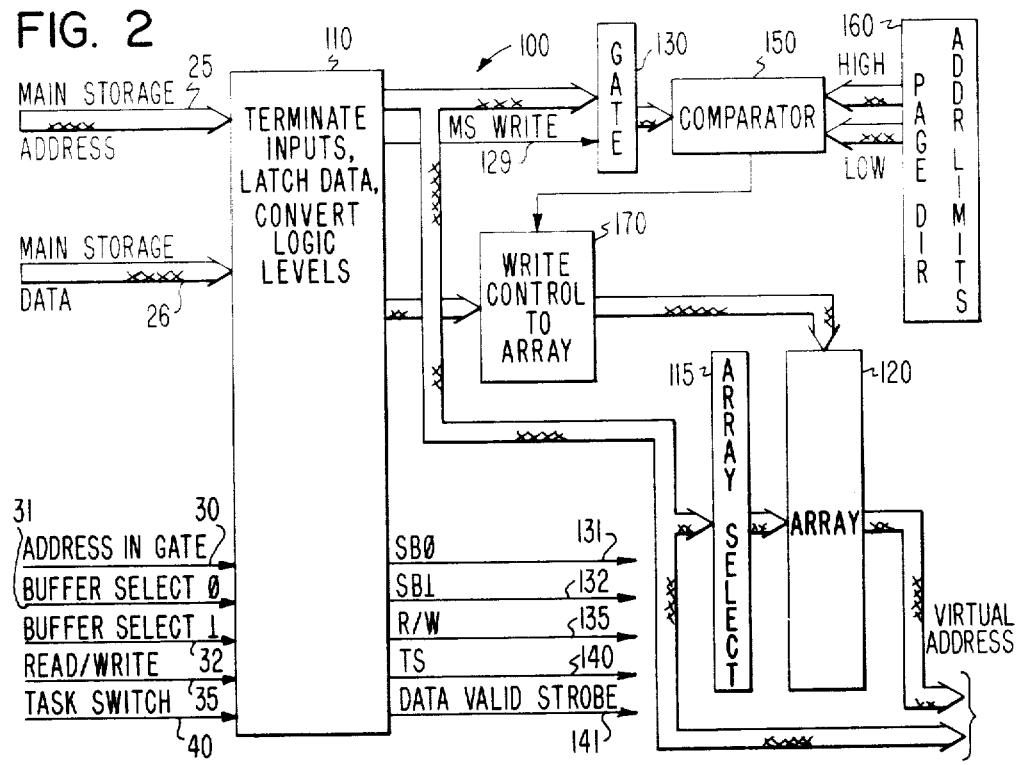
FIG. 2 is a schematic block diagram showing details of the data collection logic of FIG. 1.

With reference to the drawings and particularly to FIG. 1, the invention is shown as being attached to a central processing unit 10 of a computer system of the type shown and described in U.S. Pat. No. 4,258,417 for SYSTEM FOR INTERFACING BETWEEN MAIN STORE MEMORY IN A CENTRAL PROCESSOR by Neil C. Berglund, et al. The data to be compressed and buffered is taken from the central processing unit (CPU) 10, FIG. 1. The data from the central processing unit 10, in this particular example, includes a main storage real address which is available on main storage address bus 25, buffer select bits BS0 and BS1, available on lines 31 and 32, a read/write control signal on line 35 and a task switch signal on line 40, FIG. 2.

The actual data to be compressed and buffered are not the real main storage addresses but are virtual addresses. The virtual address lines, however, are not externally available from the CPU 10 and thus the data collection logic 100 reverses the address translation process that took place in CPU 10. The mechanism for performing the virtual to real address translation is described in U.S. Pat. No. 4,218,743 for ADDRESS TRANSLATION APPARATUS by R. L. Hoffman, et al. The apparatus for reversing the address translation process includes a directory array 120, FIG. 2, which serves the same function as the page directory described in the referenced U.S. Pat. No. 4,218,743. The main storage address on address bus 25 is applied to logic block 110, FIG. 2, which includes line terminators, latches and logic level converters. These devices are well known in the art and a detailed showing and description thereof is considered unnecessary. The high order bits of the real main storage address are set into array select register 115 and are used as an index into directory array 120. The entry in the directory array 120 located by the index in register 115 contains the high order bits of the virtual address, the low order bits of the virtual address come from the real main storage address.

Because the contents of the page directory are constantly being updated as processing progresses, it is necessary to synchronously update the contents of the directory array 120. This is accomplished by determining during a write operation if the location being written is within the page directory. The real main storage address on bus 25 is applied to gate 130 which is conditioned by a main storage write signal on line 129. Gate 130 applies the address to comparator 150 which has inputs from a register 160 indicating the boundaries of the page directory. If data is being written into the page directory as determined by comparator 150, the write control 170 for controlling the writing of data into directory array 120 is conditioned by the signal from comparator 150 to pass the data on the main storage data bus 26 whereby the contents of array 120 are updated.

Figure 3:
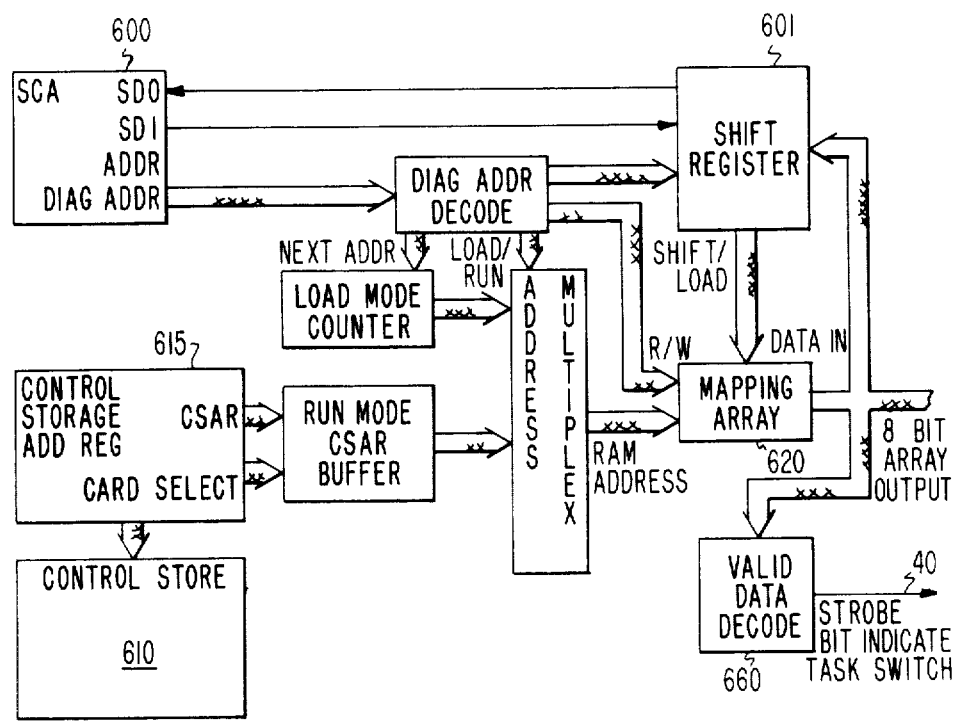
FIG. 3 is a schematic block diagram of circuitry for generating the task switch signal for the data collection logic of FIG. 2.
Figure 6:
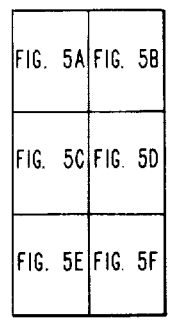
FIG. 6 is a diagram showing the arrangement of FIGS. 5a, 5b, 5c, 5d, 5e and 5f.

The virtual address formed by retranslating the real main storage address in this particular example, is 48 bits or 6 bytes but the two low order bits are not saved because they are not necessary for doing an address trace. The word in main storage 50, FIG. 1, being addressed is a 4 byte word and the two low order bits are normally used to specify which byte within the word is being accessed. That function is not necessary when doing an address trace. There are, however, additional bits which are of interest for analysis of the computer system which should be saved and these bits include, as indicated in FIG. 4, a bit for indicating whether the monitored address was used for a storage read or write operation, a bit to indicate if a task switch occurred in the CPU and 2 selection bits for indicating the source or destination in the CPU of the data being written into or read from main storage by the CPU. The bit for indicating a storage read or a storage write comes from line 135 and represents the state of the read/write line 35 which has been latched by block 110. Similarly, the bits for indicating the source or destination of the data are on lines 131 and 132 respectively and the states of the bits result from the buffer select 0 and buffer select 1 signals on lines 31 and 32 respectively which are latched by latches in block 110 under the control of an Address In Gate signal on line 30. The task switch bit on line 140 is representative of the state of the task switch signal on line 40 at the time of the storage operation. A task switch signal is not available directly from the central processing unit 10 but comes from the monitoring apparatus of FIG. 3.

The microcode routine for performing a task switch is contained in control store 610 which is substantially the same as control store 30 of referenced U.S. Pat. No. 4,258,417. Control store 610 is addressed by control storage address register (CSAR) 615 which simultaneously addresses a mapping array 620. Mapping array 620 contains one byte for each location of control store 610. For every control storage location which is to be observed, a unique value from 0 through 254, i.e., 00-FE in hexadecimal, is loaded into the corresponding byte location in mapping array 620. If a location in control storage is not to be observed, then a value of FF is loaded into a corresponding byte location of mapping array 620. An output of mapping array 620 is examined by valid data decode logic 660 which provides a strobe signal on line 40 if the value read from mapping array 620 is other than hexadecimal FF. The mapping array 620 is loaded by system control adapter 600 via shift register 601. The system control adapter 600 can be of the type set forth in U.S. Pat. No. 4,023,142 for COMMON DIAGNOSTIC BUS FOR COMPUTER SYSTEMS TO ENABLE TESTING CONCURRENTLY WITH NORMAL SYSTEM OPERATION by R. J. Woessner dated May 10, 1977.

The data collection logic 100 thus provides 50 bits of data (0-49 inclusive) to address compression logic 200. The function of the address compression logic 200 is to form two words, 16 and 17, thirty two bits in length, from the 50 bits of data in the word 15 of FIG. 4. The compression is effected, as it will be seen later herein, in that it is not always necessary to store both words 16 and 17. In fact, for each word 16 stored, the segment identifier (SID), there are several words 17 (offset) stored and their associated SID's are discarded. Thus in many instances the 50 bits of data are in effect compressed into 32 bits whereby the amount of data to be stored in the buffer is reduced.

Figure 5A:
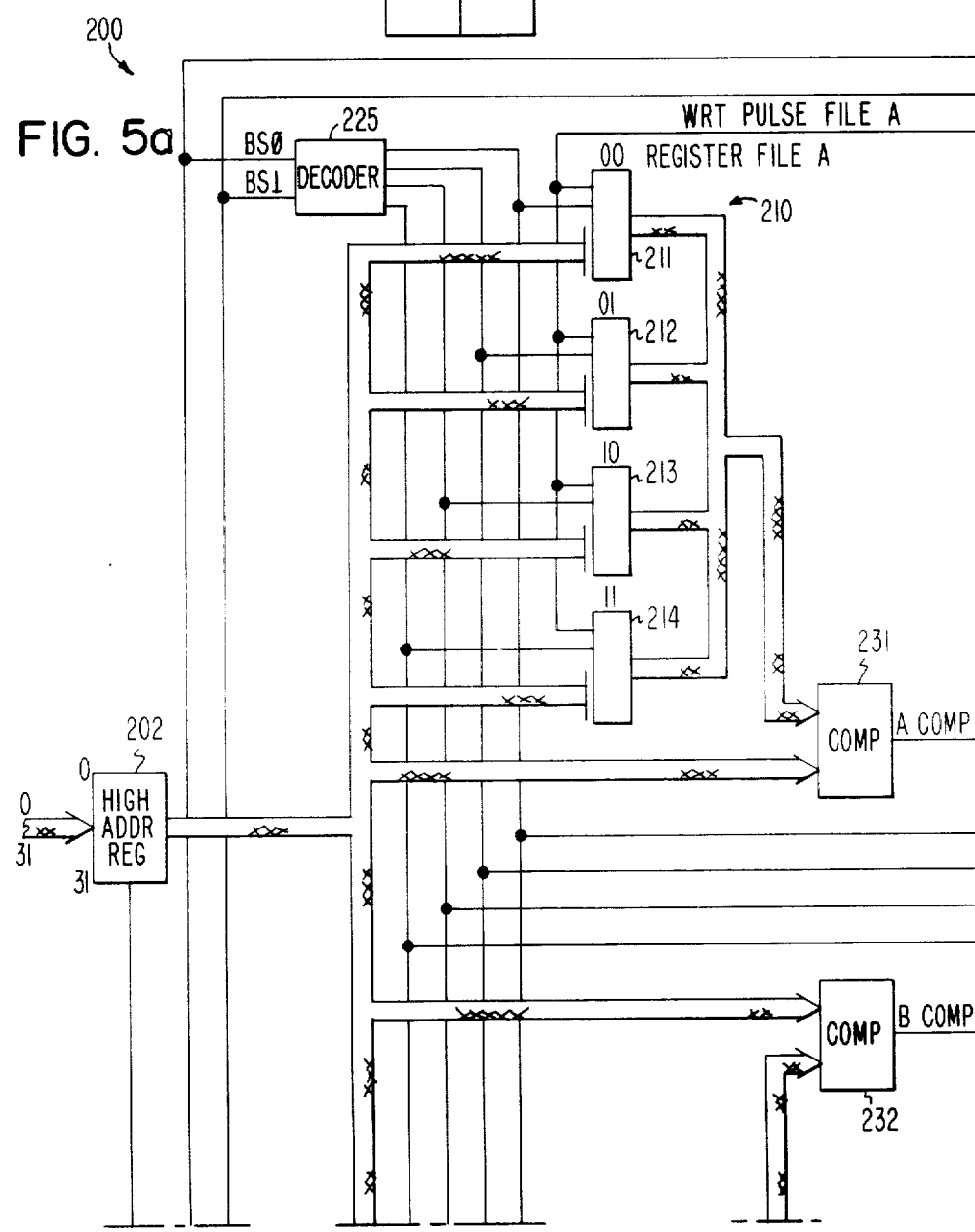
FIGS. 5a, 5b, 5c, 5d, 5e and 5f taken together as in FIG. 6, are a logic diagram of the address compression logic.

This compression, of course, must preserve the ability to decompress the data to produce the original virtual address. The high address bits of the virtual address, i.e., bits 0-31 inclusive, are entered into register 202 of the address compression logic 200, FIG. 5a, and the low address bits together with the read/write bit, the select bits and the task switch bit, are entered into low address register 204, FIG. 5c. The function of the data compression logic 200 is to determine whether or not a segment identifier (SID) 16 and an offset 17 have to be stored or whether only the offset need be stored. The offset 17 consists of the bits in the low address register 204 together with two high order bits of 0-1 to distinguish the offset 17 from a SID 16 and two low order bits for indicating the SID with which the offset is associated.

Figure 5B:
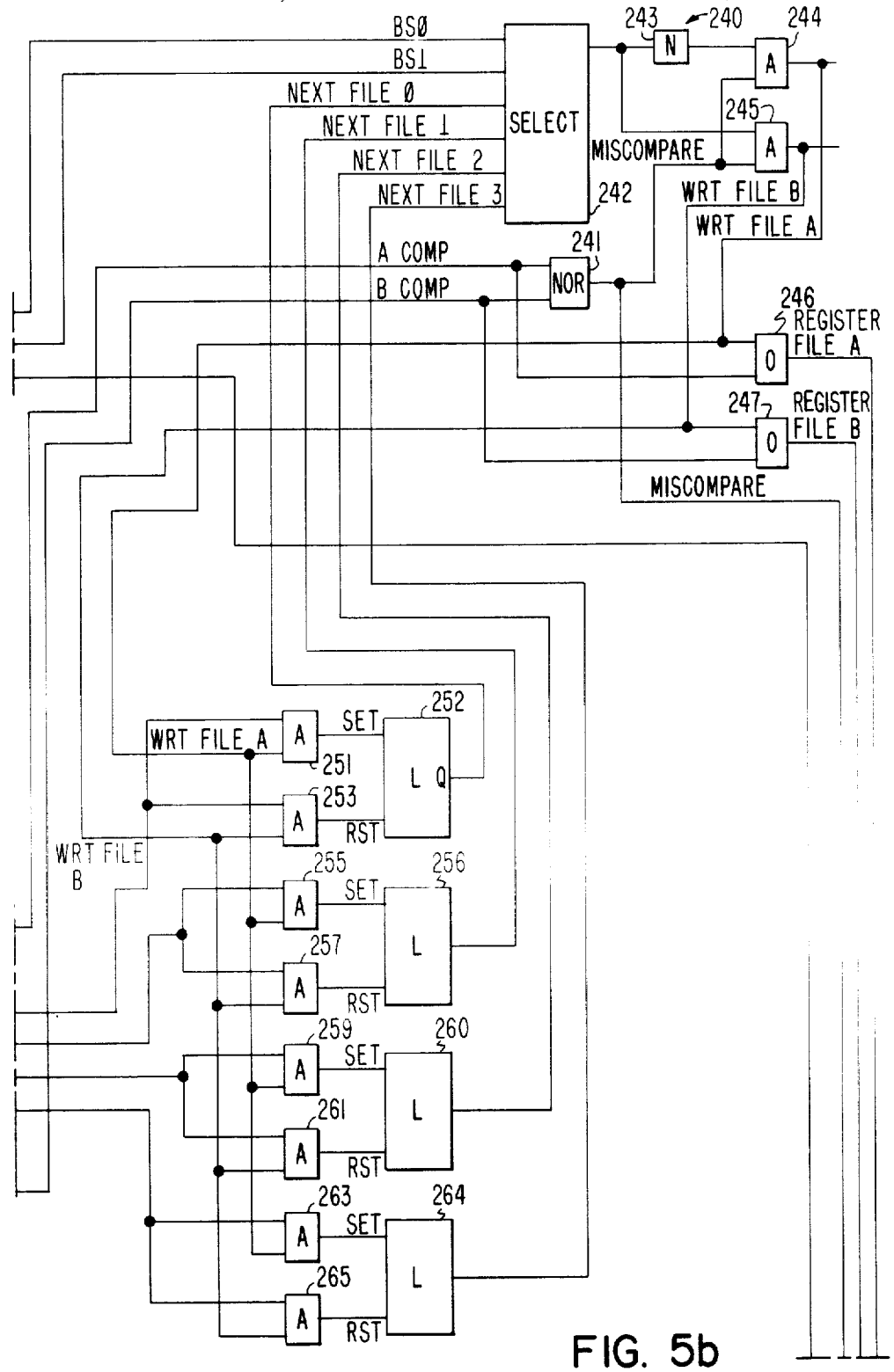

For this purpose, the address compression logic 200 includes an A register file 210 which consists of registers 211, 212, 213 and 214 and a B register file 220 which consists of registers 221, 222, 223 and 224. The registers of register files 210 and 220 are selected or addressed by the buffer select bits BS0 and BS1 in low address register 204 which are applied to decode 225. Decode 225 decodes the 2 bits into 4 bit states of 00, 01, 10 and 11 respectively. The high address from register 202 is compared with the contents of the selected register from file 210 by comparator 231 and with the contents of the selected register from register file 220 by comparator 232. If the contents of the high address register 202 do not match either of the contents from the register files 210 and 220, that condition is detected by NOR circuit 241, FIG. 5b, of the register file control circuit 240. The output of NOR circuit 241, is a Miscompare signal which is applied to AND circuits 244 and 245.

AND circuit 244 is conditioned by the output of a selector 242 via inverter 243 and its output is a WRT File A signal connected as an input to AND circuits 251, 255, 259 and 263. AND circuit 245 is conditioned directly from the output of selector 242 and its output is a WRT File B signal connected as an input to AND circuits 253, 257, 261 and 263. Selector 242 has inputs for receiving the BS0 and BS1 bits from register 204 and inputs from latches 252, 256, 260 and 264.

Latches 252, 256, 260 and 264 are set and reset by the outputs of AND circuits 251, 253, 255, 257, 259, 261 and 263, 265 respectively. AND circuits 251 and 253 are conditioned by the 00 decode line from decode circuit 225 and have inputs from AND circuits 244 and 245 respectively. AND circuits 255 and 257 are conditioned by the 01 decode from decoder 225 and have inputs from AND circuits 244 and 245 respectively. AND circuit 259 and 261 are conditioned by the decode output 10 from decoder 225 and have inputs from AND circuits 244 and 245 respectively. AND circuits 263 and 265 are conditioned by the 11 decode from decoder 225 and have input from AND circuits 244 and 245 respectively. By this arrangement, when the NOR circuit 241 detects a noncompare by both comparators 231 and 232, the contents of the high address register 202 are loaded into either register file 210 or 220 depending upon which was the least recently used file.

Figure 5C:
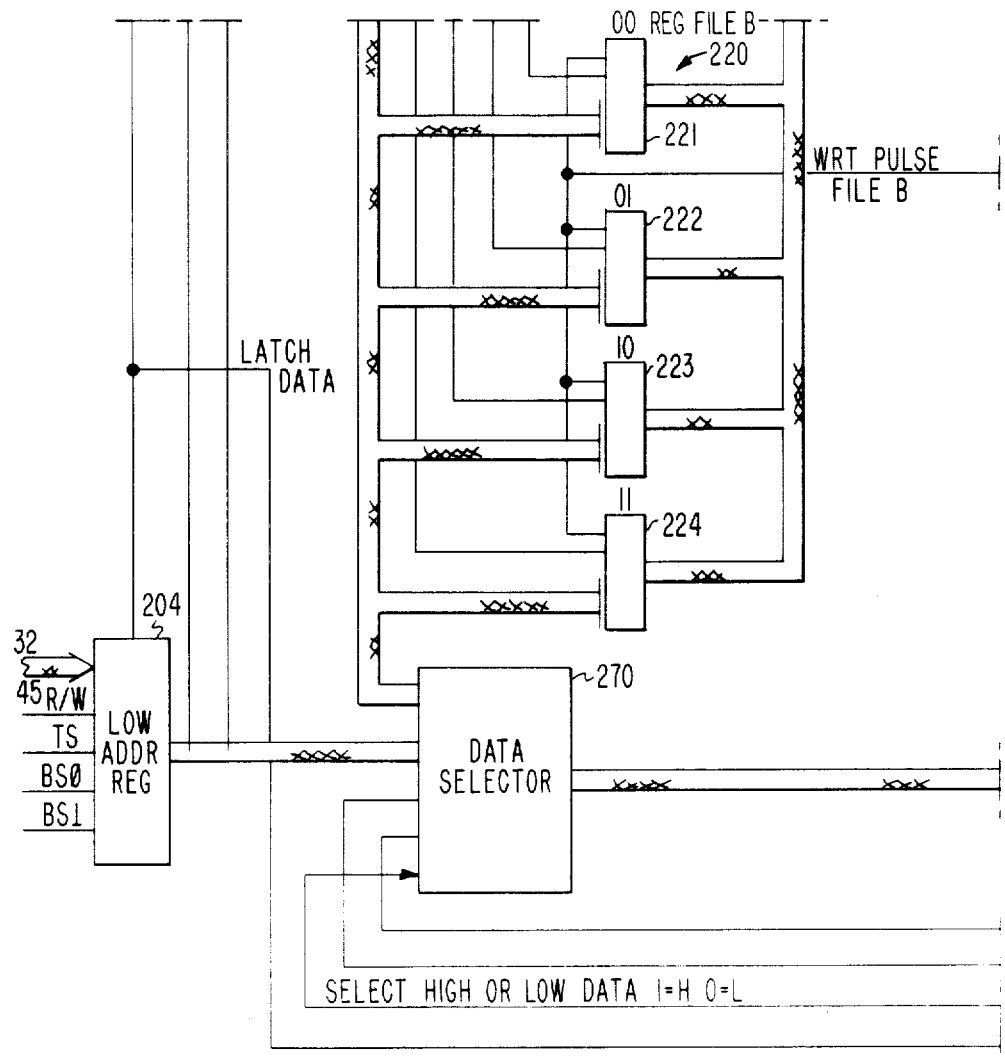
Figure 5D:
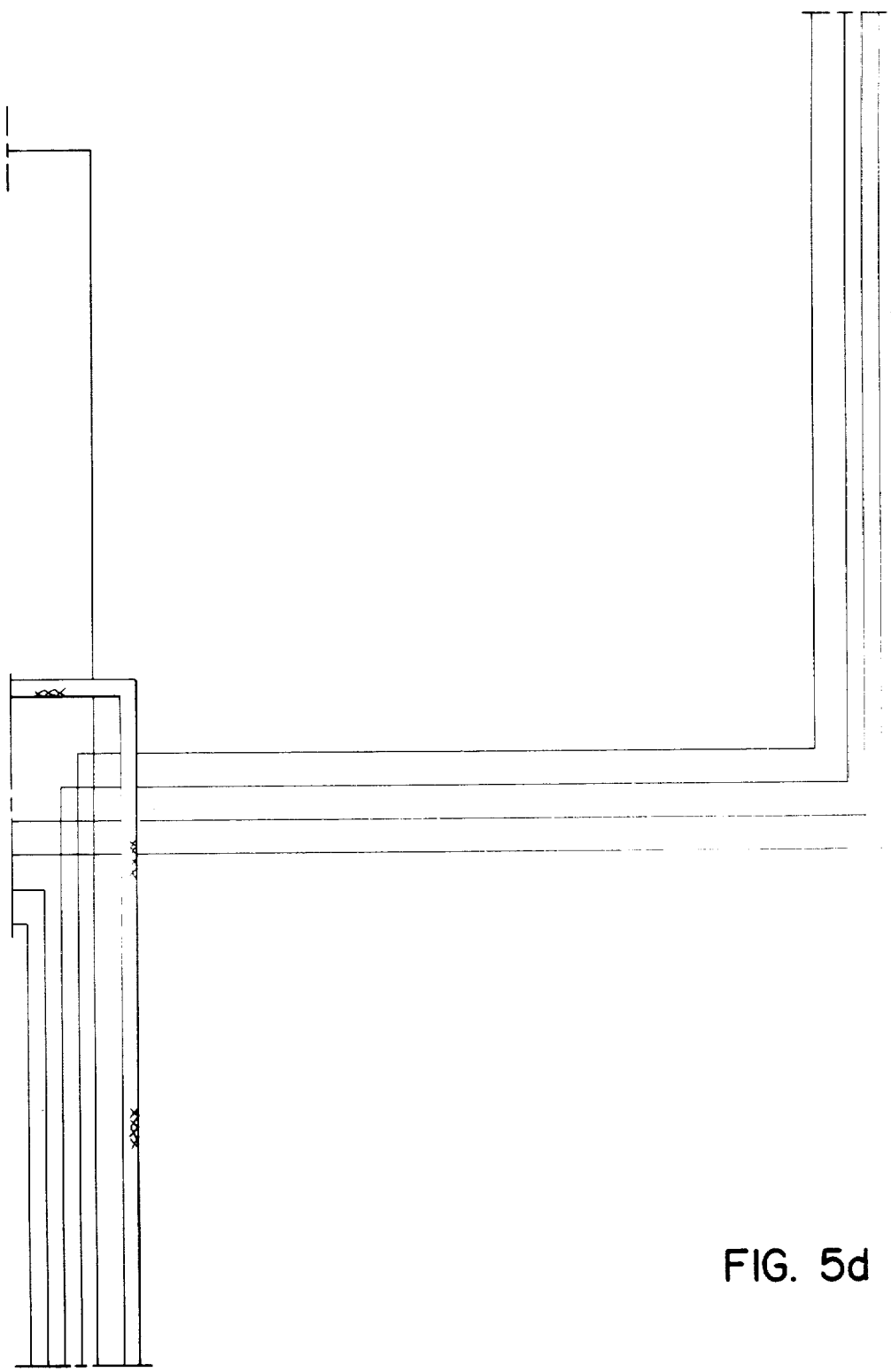
Figure 5E:
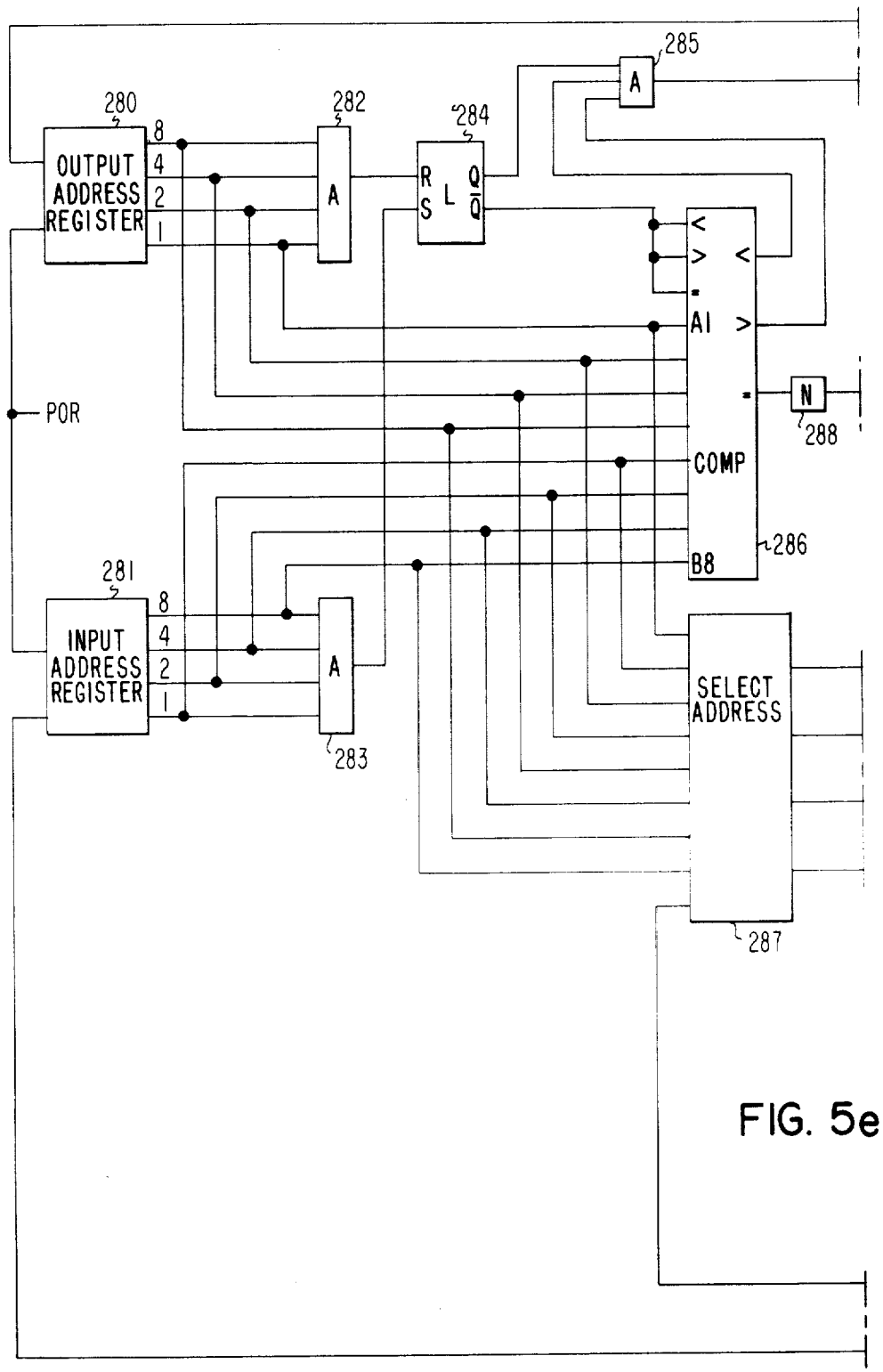
Figure 5F:
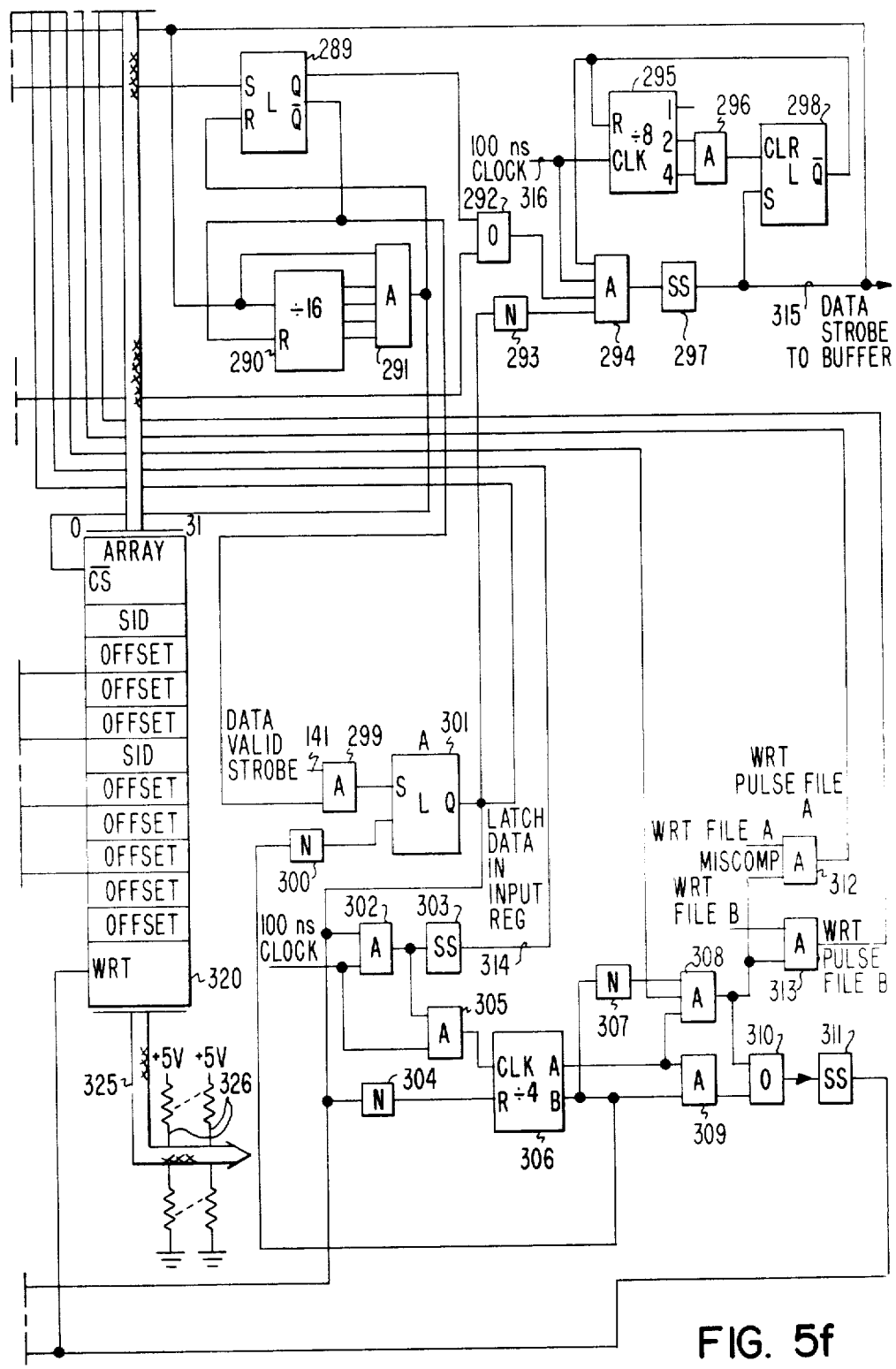

The WRT File A signal from AND circuit 244 and the WRT File B signal from AND circuit 245 are also applied to AND circuits 312 and 313, FIG. 5f, which are conditioned when there is a Miscompare signal and a particular count has been reached by a write control circuit. The Miscompare signal from NOR circuit 241 is applied to AND circuit 308 which also has inputs from a divide by 4 circuit 306 which is basically a counter rendered operable only after data has been latched into high address register 202, FIG. 5a. The divide by 4 circuit 306 has A and B outputs and AND circuit 308 functions to pass a signal at the count of 2 or when A is a 1 and B is a 0. The B output from the divide by 4 circuit 306 is applied to AND circuit 308 by inverter 307. The WRT Pulse File A and the WRT Pulse File B from AND circuits 312 and 313 respectively, are applied to the registers of file 210 and 220 respectively.

Figure 7:
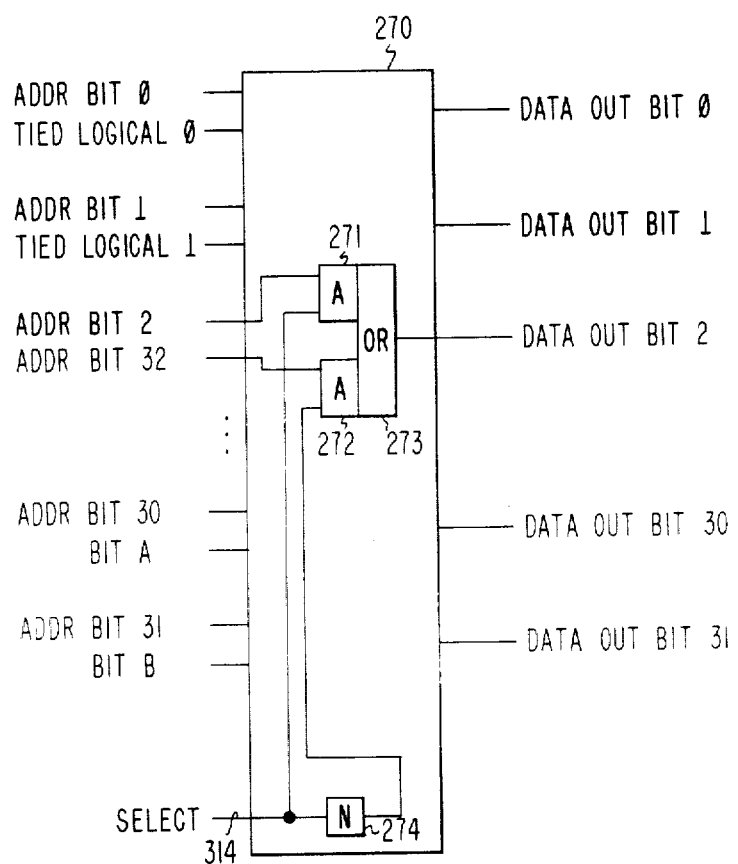
FIG. 7 is a logic diagram of the data selector for the address compression logic.

The output of AND circuit 308 is also applied to OR circuit 310 which has its output connected to single shot multivibrator 311. OR circuit 310 also has an input from AND circuit 309. The output of single shot multivibrator 311 is used to activate the write control of array 320 into which the SID 16 or offset 17 from data selector 270, FIG. 5c, is passed. Data selector 270, FIGS. 5c and 7, passes data from either high address register 202 or low address register 204 depending upon the state of a select signal on line 314. It should be noted that data selector 270, in addition to receiving the data from registers 202 and 204, also receives bits from OR circuits 246 and 247, FIG. 5b. These bits are the File A and File B bits respectively of offset 17 in FIG. 4. The states of these bits is dependent upon the states of the signals into OR circuits 246 and 247. OR circuit 246 has an input from the comparator 231 and an input from AND circuit 244. OR circuit 247 has an input from comparator 232 and an input from AND circuit 245. The select signal on line 314, FIG. 5f, comes from a 220 nanosecond single shot multivibrator 303 which is fed from the output of AND circuit 302. AND circuit 302 has a 100 nanosecond clock input and an input from latch 301. It should be noted that the output of AND circuit 302 also feeds AND circuit 305 which has its output connected to the clock input of the divide by 4 circuit 306. The reset input of the divide by 4 circuit 306 is connected to the output of latch 301 via inverter 304. Thus, in addition to writing the SID 16 into either register file 210 or register file 220 because of the miscompare, the SID 16 is written into array 320.

It should also be noted that the two high order bits in the offset 17 for distinguishing it from a SID 16 for decompress purposes are formed or set in the data selector 270. The highest order bit is tied to a voltage potential representing a logical 0 and the next highest order bit is tied to a voltage potential representing a logical 1. The A and B bits of the offset 17 as previously mentioned are passed by OR circuits 246 and 247 to the data selector 270, FIGS. 5c and 7. The data selector 270, FIG. 7, includes a set of AND circuits represented by AND circuit 271 for controlling the selection of the SID 16, these AND circuits being conditioned by the one state of the select signal on line 314. The selection of the offset 17 is controlled by a set of AND circuits represented by AND circuit 272 which is conditioned by the zero state of the select signal on line 314 via inverter 274. The set of AND circuits 271 and 272 feed a set of OR circuits represented by OR circuit 273.

Array 320 temporarily stores SIDs 16 and offsets 17, i.e., it contains the compressed data which is to be sent to the buffer 500 of FIG. 1. Array 320 is normally read from when there is a chip select signal CS from AND circuit 291, FIG. 5f. It is written into only when there is a write pulse from single shot multivibrator 311. There are two registers or counters 280 and 281, FIG. 5b, for addressing array 320. Register 281 is the input address register and register 280 is the output address register. The values in register 280 and 281 are applied to a comparator 286 which determines if the values are high, low or equal and this determination, as will be seen shortly, is used for detecting an overflow condition of the array 320. The addresses from registers 280 and 281 are also applied to selector 287 which selects one of the addresses and applies it to array 320. Selector 287 makes the selection from register 281 if latch 301 is set and selects from register 280 if latch 301 is reset.

Latch 301 is set by the output of AND circuit 299 and reset with the positive edge of a signal from inverter 300 which has its input connected to the B output of the divide by 4 circuit 306. Thus latch 301 is reset when the B output of the divide by 4 circuit 306 switches from a 1 state to a 0 state. AND circuit 299 is conditioned by the output of latch 289 and receives the Data Valid Strobe from block 110 of the data collection logic 100 via line 141.

Latch 289, which has its reset output connected to the input of AND circuit 299 is an overflow detection latch for detecting an overflow condition in the array 320. Array 320 is being read from and written into continuously unless the overflow condition occurs. Also, as it will be seen shortly, data is read from array 320 at a fixed rate of 600 nanoseconds between reads and data is written into array 320 asynchronously.

In order to detect the overflow condition and still allow wrap around of the array 320, the output of the input address register 281 is applied to AND circuit 283 and its output is connected to the set input of latch 284. Latch 284 functions like an extra bit of input register 281. The reset input of latch 284 is connected to the output of AND circuit 282 which has inputs from the outputs of output register 280. By this arrangement, the input address can wrap around with respect to array 320 without an overflow condition resulting.

The set output of latch 284 is applied to AND circuit 285 while the reset output is applied to the cascade inputs of comparator 286. Comparator 286 functions to determine if the input address and output address from registers 281 and 280 respectively are equal. The function of comparator 286 is affected by the state of latch 284. If the input and output addresses are equal and the latch 284 is reset, the equal output of comparator 286 will be a 1 indicating that all of the data in array 320 has been stored in the buffer 500. If the input and output addresses are equal and the latch 284 is set, then the equal output of comparator 286 will be a 0 and the less than and greater than outputs of comparator 286 will be 1's whereby AND circuit 285 will be satisfied and it will pass a signal to set latch 289 indicating an overflow condition, i.e., the array 320 is full and data is present to be written therein. Thus it is seen that for the overflow condition it is necessary to prevent data from being written into array 320. It also should be noted that when the input and output addresses are equal without overflow that there is no data in the array 320 to be transferred to the buffer 500.

The data read from array 320 is entered into buffer 500 only if it is strobed. Thus it is necessary to control the strobe signal on line 315, FIG. 5f. In this example, the buffer 500 has a write cycle time such that there must be a 600 nanosecond period between strobes. The strobe pulse comes from single shot multivibrator 297 which is fed by AND circuit 294. AND circuit 294 is pulsed by a 100 nanosecond clock signal on line 316 and is conditioned by outputs from OR circuit 292, inverter 293 and latch 298. OR circuit 292 has inputs from inverter 288, FIG. 5e and latch 289, FIG. 5f. Thus, if there is no overflow, i.e., latch 289 is not set, or if the input and output are not equal then OR circuit 292 passes a signal to AND circuit 294.

Inverter 293 passes a signal to condition AND circuit 294 when latch 301 is reset. Latch 301 is reset when data is not being written into array 320. The output of latch 298 is to control AND circuit 294 so as to maintain the 600 nanosecond period between strobes.

The 100 nanosecond clock on line 316 is also fed to a 3 bit binary counter 295 where output bits 2 and 4 are applied to AND circuit 296. The output of AND circuit 296 is applied to the clear or reset input of latch 298. Latch 298 is set by the pulse or strobe from single shot multivibrator 297. By this arrangement, after 600 nanoseconds have been accumulated latch 298 is cleared and counter 295 is reset. Additionally, AND circuit 294 is conditioned whereby if all the other input conditions to AND circuit 294 are met a pulse is passed to single shot multivibrator 297 and a Data Strobe signal is produced on line 315.

It should be noted that when the overflow condition exists, i.e. with latch 298 set, AND circuit 299, which has an input from the reset output of latch 289 is no longer conditioned and thus latch 301 will not be set with a Data Valid Strobe signal and therefore no additional data will be written into array 320. Data will, however, be read from array 320 even though the overflow condition exists. The reset output of latch 289 holds counter 290 reset unless latch 289 is set.

Counter 290 is thus conditioned when overflow exists. Counter 290 is incremented by the Data Strobe signal on line 315. By this arrangement, data is read from array 320 and in this example the array is emptied in 15 reads. AND circuit 291 detects when counter 290 has all 1's on its output and when this condition exists, the Chip Select signal CS to array 320 goes positive or to the 1 state. Because array 320 has tri-state outputs and when the Chip Select signal is positive, the outputs of array 320 are at a high impedance state whereby the terminating resistors 326 bring the outputs of bus 325 to a 1 state. FIG. 5f. The Data Strobe signal on line 315 is still generated and thus all 1's are written into the buffer 500. These all 1's are then indicative that an overflow condition did exist. This information is used when the data from buffer 500 is analyzed.

It is thus seen that when an overflow condition does exist, some data is lost but the data already in the array 320 is read out and as soon as the read out is completed, the overflow latch 289 is reset and the writing into array 320 can take place because as soon as the data strobe expires or changes state AND circuit 291 is no longer conditioned and further counter 290 has been reset with the resetting of the latch 289. Thus the Chip Select signal CS reverts to the negative or 0 state whereby data can be read and written into array 320, the reading of course being dependent upon the state of latch 301 which can be set via AND circuit 299 with a Valid Strobe signal as soon as the overflow latch 289 is reset.

Figure 8A:
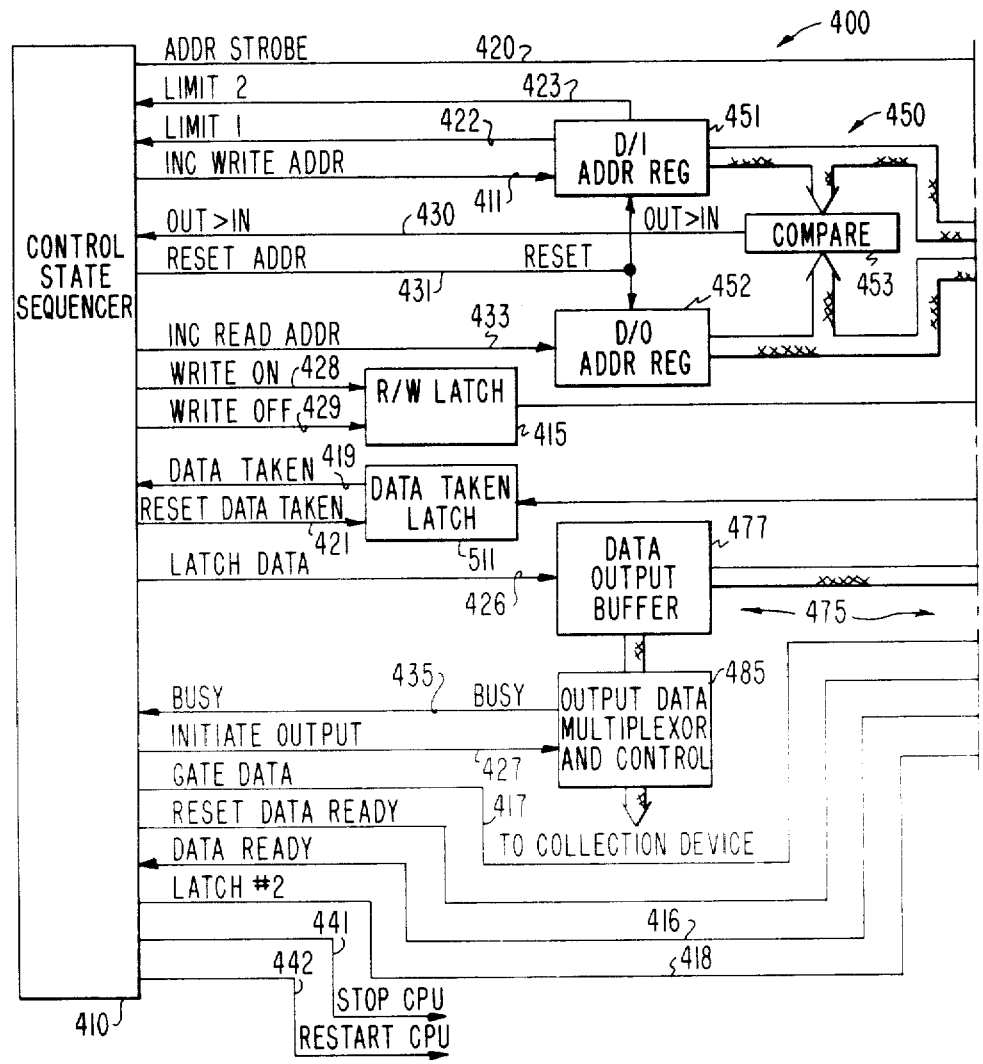
FIGS. 8a and 8b, with FIG. 8a disposed to the left of FIG. 8b, taken together are a logic diagram of the buffer control logic of FIG. 1.
Figure 8B:
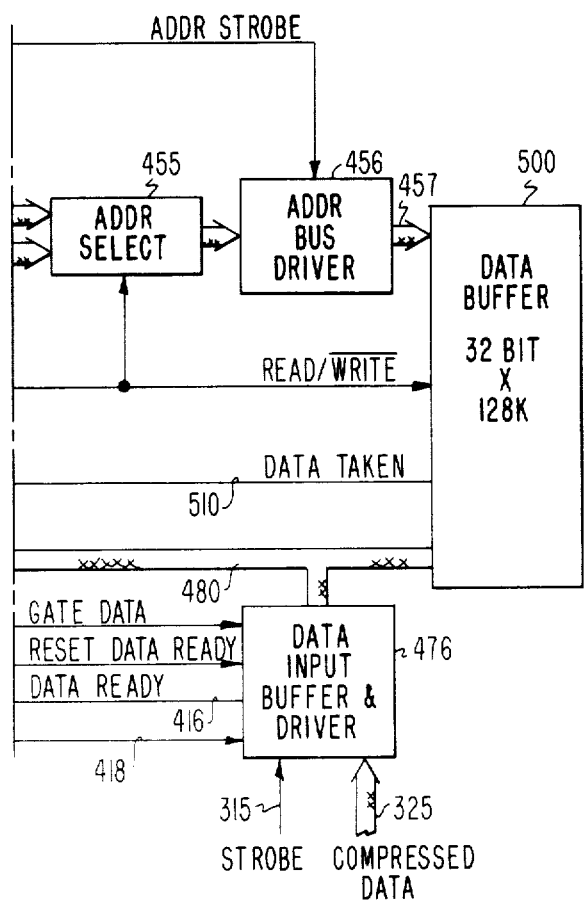

The compressed data taken from array 320 is entered into buffer 500 under control of buffer control logic 400, FIGS. 8a and 8b. The compressed data is entered into the data input buffer and driver 476, FIG. 8b when a strobe is available on line 315. This data is then read into buffer 500 in a location selected by an address in buffer address register 450. The buffer address register 450, as it will be seen shortly, includes an input address register 451 and an output register 452. When the strobe signal on line 315 was applied to data input buffer and driver 476 a latch therein was set whereby a Data Ready signal on line 416 was applied to control state sequencer 410.

Figure 9:
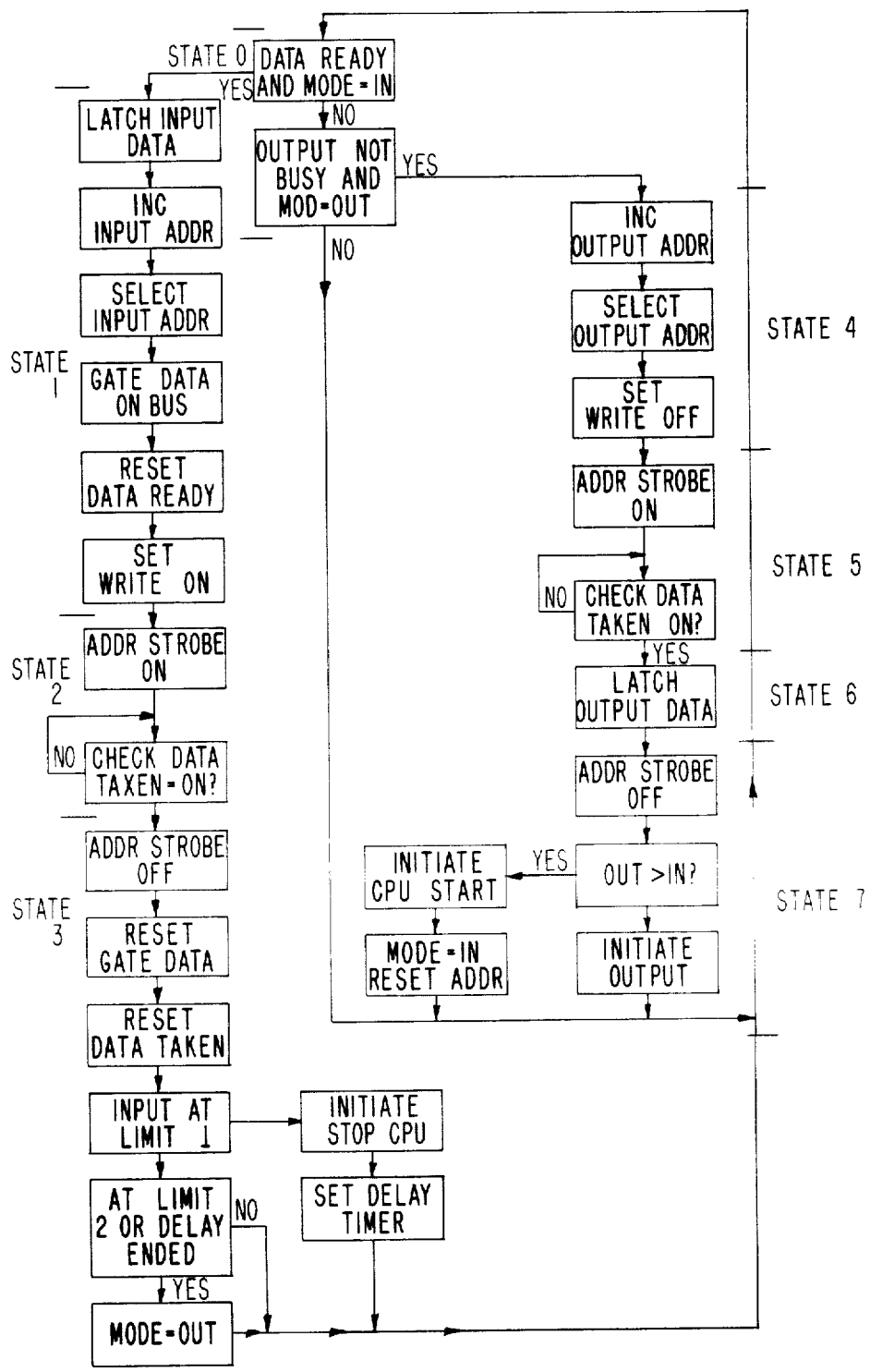
FIG. 9 is a flow diagram illustrating the logic of the sequencer of the buffer control logic.

Control state sequencer 410 consists of latches and combination logic to provide a latch 2 signal which will be described and operates in a sequence as set forth in the flow diagram of FIG. 9. Control state sequencer 410 is responsive to the Data Ready signal and provides the Latch 2 signal on line 418 to data-input buffer and driver 476. Data input buffer and driver 476 has two internal buffers and the Latch 2 signal causes the transfer data from the first to the second buffer so that a second word of compressed data can be entered into data input buffer and driver 476 before the first word of compressed data entered therein has been transferred into data buffer 500.

Sequencer 410 then provides an Increment signal on line 411 to the input address register 451 which can be in any state and the Increment signal causes the input address register 451 to latch with the leading edge of the Increment signal and be incremented with the trailing or falling edge of that signal. The input address register 451 had been reset initially by the sequencer 410 and when the increment takes place for the first time the all 0's condition is set into the latches for the first address with the leading edge of the Increment signal and then the register is incremented whereby the next address is immediately available with the next Increment signal. This arrangement is for speed purposes.

The address in the input address register 451 is selected by address selector 455 which receives a signal from read/write latch 415 which is set with a Write On signal from sequencer 410 over line 428. The signal from latch 415 is applied to data buffer 500 to place the buffer in a write state. The output of the address select block 455 is applied to the Address Bus Driver block 456 which in turn applies the selected address to the buffer 500. The sequencer 410 then provides a Gate Data signal on line 417 to gate the data from the Data Input Buffer and Driver 476 onto the bi-directional bus 480. The sequencer 410 provides an Address Strobe signal on line 420 to the Address Bus Driver block 456 whereby the address is applied to data buffer 500. Buffer 500 has its own clock and after the data has been stored, it provides a Data Taken signal on line 510 to set an edge triggered latch 511 to latch up the Data Taken signal on line 419 which then is applied from latch 511 to sequencer 410. Sequencer 410 is responsive to the Data Taken signal and turns off the Address Strobe signal on line 420. Sequencer 410 then drops or turns off the Gate Data signal on line 417 and provides a Reset Data Taken signal on line 421 to reset the data taken latch 511 to ready it for the next data storage operation.

The storing of data in buffer 500 is continued at 600 nanosecond intervals and when the address in the input address register 451 reaches a predetermined limit which in this example is called Limit 1, i.e., the buffer is approaching fullness, as determined by the address in address register 451, the Limit 1 signal is sent to sequencer 410 over line 422. Sequencer 410 is responsive to the Limit 1 signal to initiate a Stop CPU signal on line 441 which is transmitted to the CPU start/stop control circuit 550, FIGS. 1 and 10, and a delay timer in sequencer 410 is started or set to allow operations within the central processing unit (CPU) 10 to complete before switching from writing data into buffer 500 to reading data therefrom. The writing of data into buffer 500 continues until a second limit is reached or the delay has timed out. Normally the delay timer will end prior to reaching Limit 2 but in any even Limit 2 is set just under the limit or capacity of data buffer 500 so that it does not overflow and change the data already in the buffer. This arrangement can handle the worst case condition which would be when a command has been just issued in the CPU 10 for transferring 64K bytes of data.

When a mode switch is made, as determined by sequencer 410, i.e, in response to the Limit 2 signal on line 423 or the delay timer timing out, the sequencer 410 increments the output address register 452 in the same manner that it incremented register 451. Sequencer 410 then provides a Write Off signal on line 429 to reset latch 415 which then provides a Read signal to address select 455 and to data buffer 500. The Read signal causes the address select 455 to select the address from the output address register 452 and the buffer 500 is placed in the read mode.

Sequencer 410 then provides an Address Strobe signal on line 420 whereby the selected address from the output address register 452 is transmitted to the data buffer 500 by the Address Bus Driver block 456. The data at the selected address is read from buffer 500 over bi-directional bus 480 to the Data Output Buffer 477. Data buffer 500 upon completion of the read provides the Data Taken signal on line 510 to set latch 511. Sequencer 410 is responsive to the Data Taken signal to generate a Latch Data signal on line 426 to the Data Output Buffer 477 for latching the data therein. Sequencer 410 also resets the Data Taken latch 511 with the Reset Data Taken signal on line 421. Sequencer 410 drops the Address Strobe signal on line 420. Sequencer 410 will then send an Initiate Output signal on line 427 to Output Data Multiplexer and Control 485 if the output address in register 452 is not greater than the address in register 451 as determined by compare circuit 453. Compare circuit 453 provides the signal on line 430 indicating the results of the compare operation, i.e., whether or not the output address is greater than the input address. It should be noted that the input address in register 451 has not been modified since the mode switch from input to output had been made. The Output Data Multiplexer 485 has its own clock and can provide a Busy signal on line 435 to sequencer 410. The Busy signal on line 435 keeps sequencer 410 from incrementing the output address register 452 until the data read from buffer 500 has been transmitted to a collection device such as a tape drive. In this example, the Output Data Multiplexer and Control 485 is used because the data in output buffer 477 is transmitted to the collection device in increments of data. The Output Data Multiplexer and Control 485 could be eliminated if the collection device could receive the whole word of data read from buffer 500.

Sequencer 410, in response to the Busy signal on line 435 dropping, provides an INC READ ADDR signal on line 433 to increment address register 452 and the cycle just described repeats. Reading of data from buffer 500 continues until the address in address register 452 is greater than the address in register 451. When this occurs, sequencer 410 provides a Start or Restart CPU signal on line 442, the mode is switched from a read mode to a write mode and a Reset Address signal on line 431 is applied to registers 451 and 452. Data can then be written into data buffer 500 after the CPU 10 starts its operation.

The stop CPU signal on line 441 is applied to the set input of latch 551, FIG. 10, of the CPU start/stop circuit 550. The CPU 10 has a system control adapter console switch 1 which controls the starting and stopping of the CPU in combination with a system load push button. The output of the latch 551 is applied to an open collector driver 552 which effectively changes the output of switch 1 to a stop value.

The stop CPU signal is also applied to a single shot multivibrator 554 via OR circuit 553. Single shot multivibrator 554, in this example, has a duration of approximately 50 microseconds and its output is applied to open collector driver 555 and the output from it is applied to the system load push button whereby a signal is present as if the system load push button were held depressed for a sufficient period of time whereby the signal from switch 1 causes the CPU to be stopped.

The restart CPU signal on line 442 resets latch 551 and in doing so it changes the value of switch 1 to a value for starting the CPU 10. The restart CPU signal is also applied to single shot multivibrator 554 via OR circuit 553 and driver 555 is again activated to operate the system load push button for the required period of time whereby the CPU 10 is restarted.

From the foregoing, it is seen that the invention provides apparatus for compressing and buffering large amounts of data collected in a high-speed hardware monitoring environment and for transferring this data to a slow speed storage device such as a tape. Further, it is seen that when the buffer is full the CPU is stopped and the buffer is then emptied to the slow speed storage device and the CPU is restarted at the exact point it had stopped.

We claim:

1. Apparatus for compressing and buffering large amounts of data collected in real time from a computer system having a central processing unit (CPU), control means having an output for starting and stopping said CPU, virtual storage addressed by virtual storage addresses and real storage addressed by real storage addresses formed by converting the virtual addresses to real storage addresses, the improvement comprising;

means for converting said real storage addresses to virtual storage addresses where said virtual storage addresses include a segment identifier and an offset;

compression menas for compressing said virtual storage addresses formed by converting said real storage addresses, said compression means including means for adding leading bits to said offset to distinguish said offset from said segment identifier, means for adding other bits to said offset to relate said offset to a segment identifier and means for temporarily storing only unique segment identifiers of said virtual storage addresses formed by converting said real addresses and for temporarily storing all offsets including said added bits;

buffer means coupled to the compression means for storing said segment identifiers and said offsets temporarily stored by said compression means;

monitoring means for monitoring said buffer means and providing a stop CPU signal to said control means upon said buffer means having a predetermined amount of data; and emptying means coupled to the monitoring means for emptying said buffer means to a collection device after it has been filled with said predetermined amount of data and for providing a start CPU signal to said control means after said buffer has been emptied.

2. The apparatus for compressing and buffering large amounts of data of claim 1 wherein a segment identifier or an offset is read by the emptying means from said temporary storage means of said compression means if no data is present to be written into said temporary storage means.

3. The apparatus for compressing and buffering large amounts of data of claim 1 wherein segment identifiers and offsets are written into said temporary storage means asynchronously and are transferred therefrom to the buffer means at a rate not to exceed a predetermined rate.

4. The apparatus for compressing and buffering large amounts of data of claim 3 wherein said predetermined rate is dependent upon the rate at which data can be stored in said buffer means.

5. The apparatus for compressing and buffering large amounts of data of claim 1 wherein said compression means includes overflow detecting means for detecting if said temporary storage means will overflow if a segment identifier or offset is to be written therein and providing an overflow signal upon such detection.

6. The apparatus for compressing and buffering large amounts of data of claim 5 further comprising means coupled to the overflow detecting means for inhibiting the compression means from writing a segment identifier or offset into said temporary storage means in response to the overflow signal.

7. The apparatus for compressing and buffering large amounts of data of claim 6 further comprising means coupled to the temporary storage means for detecting when all of the segment identifiers and offsets have been read from said temporary storage means and forming a special data word after all of the segment identifiers and offsets have read from said temporary storage means in response to said overflow condition and transferring said special word to said buffer means.

8. The apparatus for compressing and buffering large amounts of data of claim 7 further comprising means for detecting with all segment identifiers and offsets have been read from said temporary storage means and said special word has been formed;

said detecting means providing a signal to said overflow means to indicate that said special word has been formed whereby said overflow detecting means enable the writing of segment identifiers and offsets into said temporary storage means.

9. The apparatus for compressing and buffering large amounts of data of claim 1 wherein said monitoring means for monitoring the amount of data in said buffer means includes detecting means for detecting first and second amounts of data in said buffer means, said first amount of data being used by said monitoring means to provide said stop CPU signal and said second amount of data being used for signalling said emptying means for emptying said buffer means.

10. The apparatus for compressing and buffering large amounts of data of claim 9 wherein the writing of data into said buffer means in inhibited when said second amount of data is reached.

11. The apparatus for compressing and buffering large amounts of data of claim 1 wherein said stop CPU signal is provided to said control means at the output thereof so as to be logically combined to change the output indication of said control means.

12. The apparatus for compressing and buffering large amounts of data of claim 1 wherein said start CPU signal is provided to said control means at the output thereof to be logically combined with the control means output to change the output of said control means and thereby simulate operation of said control means to the CPU.

* * * * *